United States Patent

[11] 3,618,054

[72] Inventors Peter I. Bonyhard
Newark;
Umberto F. Gianola, Florham Park;
Anthony J. Perneski, Martinsville, all of N.J.

[21] Appl. No. 875,338
[22] Filed Nov. 10, 1969
[45] Patented Nov. 2, 1971
[73] Assignee Bell Telephone Laboratories, Incorporated
Murray Hill, N.J.

[54] MAGNETIC DOMAIN STORAGE ORGANIZATION
8 Claims, 7 Drawing Figs.

[52] U.S. Cl. .... 340/174 TF, 340/174 SR, 340/174 M
[51] Int. Cl. .... G11c11/14, G11c 21/00
[50] Field of Search .... 340/174 TF, 174 SR

[56] References Cited
UNITED STATES PATENTS
3,534,347 10/1970 Bobeck .... 340/174

*Primary Examiner*—James W. Moffitt
*Attorneys*—R. J. Guenther and Kenneth B. Hamlin ABSTRACT: A single wall domain propagation arrangement herein includes magnetically soft overlay patterns which generate magnetic poles in response to reorienting inplane fields to move domains in propagation channels defined thereby. The arrangement is organized for high packing density and fast access by providing parallel recirculating bit channels to move consecutive binary word representations to a common recirculating channel. The common channel moves the word to a common read-write area. Information moves synchronously in the common channel, as well as in the parallel channels, permitting the return of information to the parallel channels with little logic circuitry.

INVENTORS P.I. BONYHARD
U.F. GIANOLA
A. J. PERNESKI
BY Herbert M. Shapiro
ATTORNEY

MAGNETIC DOMAIN STORAGE ORGANIZATION

FIELD OF THE INVENTION

This invention relates to data processing arrangements and, more particularly, to such arrangements comprising domain propagation devices.

BACKGROUND OF THE INVENTION

Domain propagation devices are well known in the art. In most such devices, a reverse-magnetized domain, having spaced-apart leading and trailing domain walls, is moved controllably in a channel structured to prevent lateral motion of the domain. The Bell System Technical Journal (BSTJ), Volume XLVI, No. 8, Oct. 1967, at page 1901 et seq., on the other hand, describes a domain which is (self) bounded by a single domain wall and is free to move in the plane of the sheet. Movement of a domain in the latter case is in response to an offset structured magnetic field (gradient) which displaces the domain in the medium in the absence of uncontrolled expansion thereof.

A typical magnetic sheet in which single wall domains are moved comprises, for example, a rare earth orthoferrite or a strontium or barium ferrite. The domains assume the shape of right circular cylinders the axes of which are normal to the plane of a sheet of these materials. The sheets are characterized by a preferred direction of magnetization normal to the sheet, magnetization in a first direction along that normal being considered negative (−) and magnetization in a second direction being considered positive (+). A convenient convention is to represent a single wall domain in such a sheet as an encircled plus sign where the circle in the plane of the sheet represents the encompassing single wall of the domain. In connection with the ensuing discussion, the plus sign may be omitted and the domain represented solely as a circle, it being implicitly understood that the magnetization elsewhere in the sheet other than within circles is negative.

There are a variety of techniques for moving single wall domains. One comprises offset conductor loops pulsed in sequence to displace domains to next consecutive positions. The displacement is effected by the magnetic field gradient temporarily induced by the current pulse in the conductors. This technique permits a highly flexible control over individual domains since a large number of permutations of current polarities in a network of individual conductors are possible. But the technological difficulties of manufacturing a continuous network of fine conductors make it difficult to realize the minute dimensions required to manipulate very small cylindrical domains, for example, domains of the order of microns in diameter.

Another technique for moving single wall domains employs a magnetically soft structured overlay on the sheet in which single wall domains are moved. Such an arrangement is disclosed in copending application Ser. No. 732,705, filed May 28, 1968 and now U.S. Pat. No. 3,534,347 for A. H. Bobeck. The overlay generates a dynamic pattern of magnetic poles which move in the overlay in response to controlled changes in amplitude and/or direction of an externally produced magnetic field applied parallel to the plane of the sheet. The poles attract or repel domains along a predictable path determined by the particular overlay pattern and the consecutive orientations of the externally applied magnetic field. This technique has the virtue that the structured overlay that physically establishes the position and the motion of the domains is not required to carry currents and so can be substantially thinner than current-carrying conductors. The fine-line conductors, consequently, offer fewer technological difficulties when manufactured in the dimensions required to manipulate domains of minute size. The technique permits movement of all domains in a sheet without discrete wiring connections.

A propagation technique employing such an overlay is clearly attractive for recirculating-type memories such as disc files where information is moved constantly and the read and write operations are carried out at a common location. This type of organization, of course, reduces the number of detector-input circuits. No external connections are required except at a common write-read location.

The present invention is directed 1 the organization of a single wall domain arrangement employing an overlay for reduced access time and a reduced number of external connections. For example, consider a situation where a memory has a million bits per square inch packing density and can be operated at a megacycle bit rate. If the memory comprised a single channel with a single read-write point (port), up to one second would be required to access a most remote bit. The memory, on the other hand, could be organized in a $10^3 \times 10^3$ array (within $2 \times 10^3$ by $2 \times 10^3$ positions) where the entire information array is moved along both the X or Y directions to locate a selected bit at a read-write point. In this instance, maximum access time to a selected bit is reduced to an attractive 2 milliseconds but the area used is increased by a factor of four, effectively reducing the packing density.

An object of this invention is to provide a recirculating mass memory having both relatively high access speeds and packing densities.

BRIEF DESCRIPTION OF THE INVENTION

In single wall domain propagation devices wherein domains are moved in response to inplane rotating fields as described above, domains are conveniently in continuous motion representing recirculating information as in familiar disc files. In accordance with the present invention, a structured magnetically soft overlay defines in a sheet of magnetic material a number of parallel recirculating channels for domains and an additional recirculating channel arranged perpendicular thereto. The arrangement of the perpendicular channel with respect to the parallel channels is chosen such that a domain pattern can be transferred to it simultaneously from the parallel recirculating bit channels during operation. The domain pattern so transferred constitutes a binary word for propagation to a single read-write position associated with the additional recirculating channel.

In an illustrative embodiment, the transfer is accomplished via a pulsed transfer conductor.

DETAILED DESCRIPTION

Figure 1:
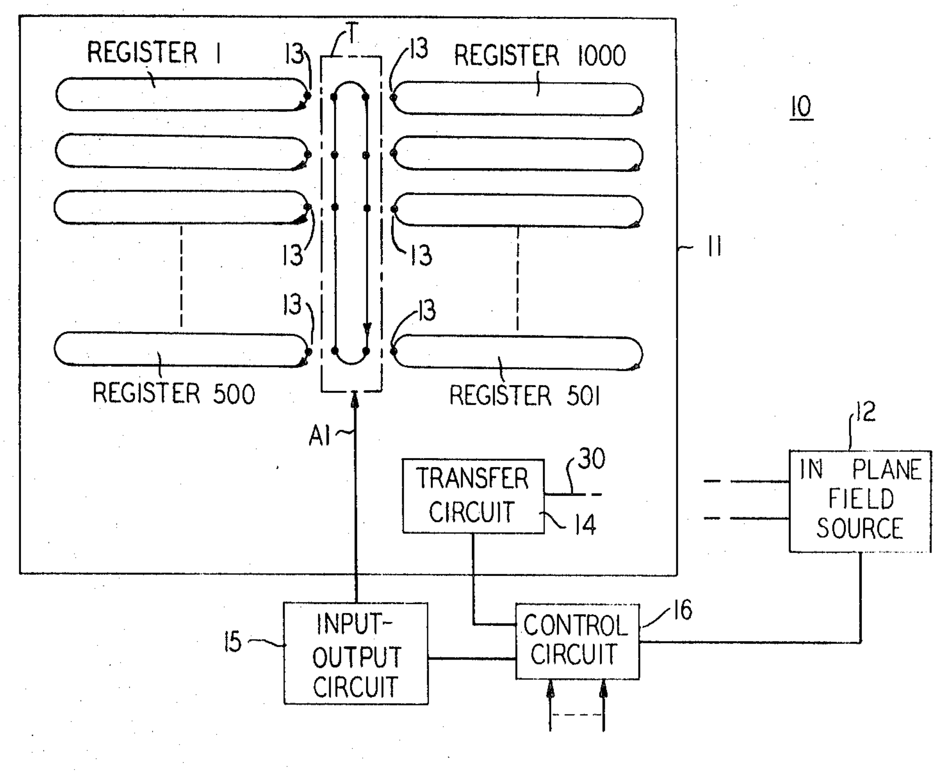
FIG. 1 is a schematic diagram of a recirculating memory in accordance with this invention.

FIG. 1 shows an arrangement 10 including a sheet or slice 11 of material in which single wall domains can be moved. The movement of domains in accordance with this invention is dictated by patterns of magnetically soft overlay material in response to reorienting inplane fields. For purposes of description, the overlays are bar and T-shaped segments and the reorienting inplane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization in accordance with this invention unencumbered by the details of the implementation. We will return to an explanation of the implementation hereinafter.

The figure shows a number of horizontal closed loops separated into right and left banks by a vertical closed loop as viewed. It is helpful to visualize information, i.e., domain patterns, circulating clockwise in each loop as an inplane field rotates clockwise. This operation is consistent with that disclosed in the aforementioned application of A. H. Bobeck and is explained in more detail hereinafter.

The movement of domain patterns simultaneously in all the registers represented by loops in FIG. 1 is synchronized by the inplane field. To be specific, attention is directed to a location identified by the numeral 13 for each register in FIG. 1. Each rotation of the inplane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated, that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the inplane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by clock 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the inplane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions (13) where a transfer operation moves the pattern from the vertical channel back into appropriate horizontal channels as described above. Once again, the information movement is always synchronized by the rotating field so that when transfer is carried out, appropriate vacancies are available in the horizontal channels at positions 13 of FIG. 1 to accept information.

Figure 2:
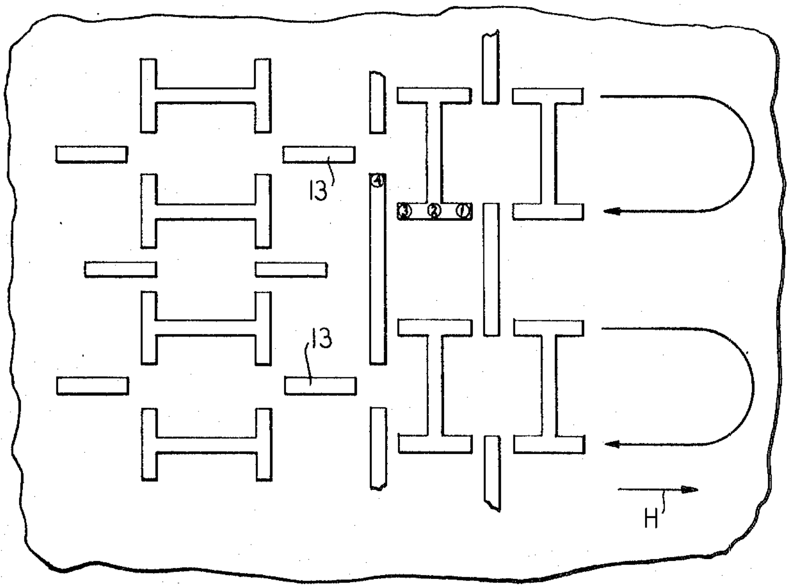
FIGS. 2–7 are detailed magnetic overlay and wiring configurations for portions of the memory of FIG. 1, showing domain locations during operation.

For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portions of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3, and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating inplane fields. That operation is described in detail in the above mentioned application of Bobeck. Instead, the consecutive positions from the right as viewed in FIG. 2, for a domain adjacent the vertical channel preparatory to a transfer operation are described. A domain in position 4 of FIG. 2 is ready to begin its transfer cycle.

The transfer of domains between horizontal and vertical channels is discussed in connection with FIG. 3.

Figure 3:
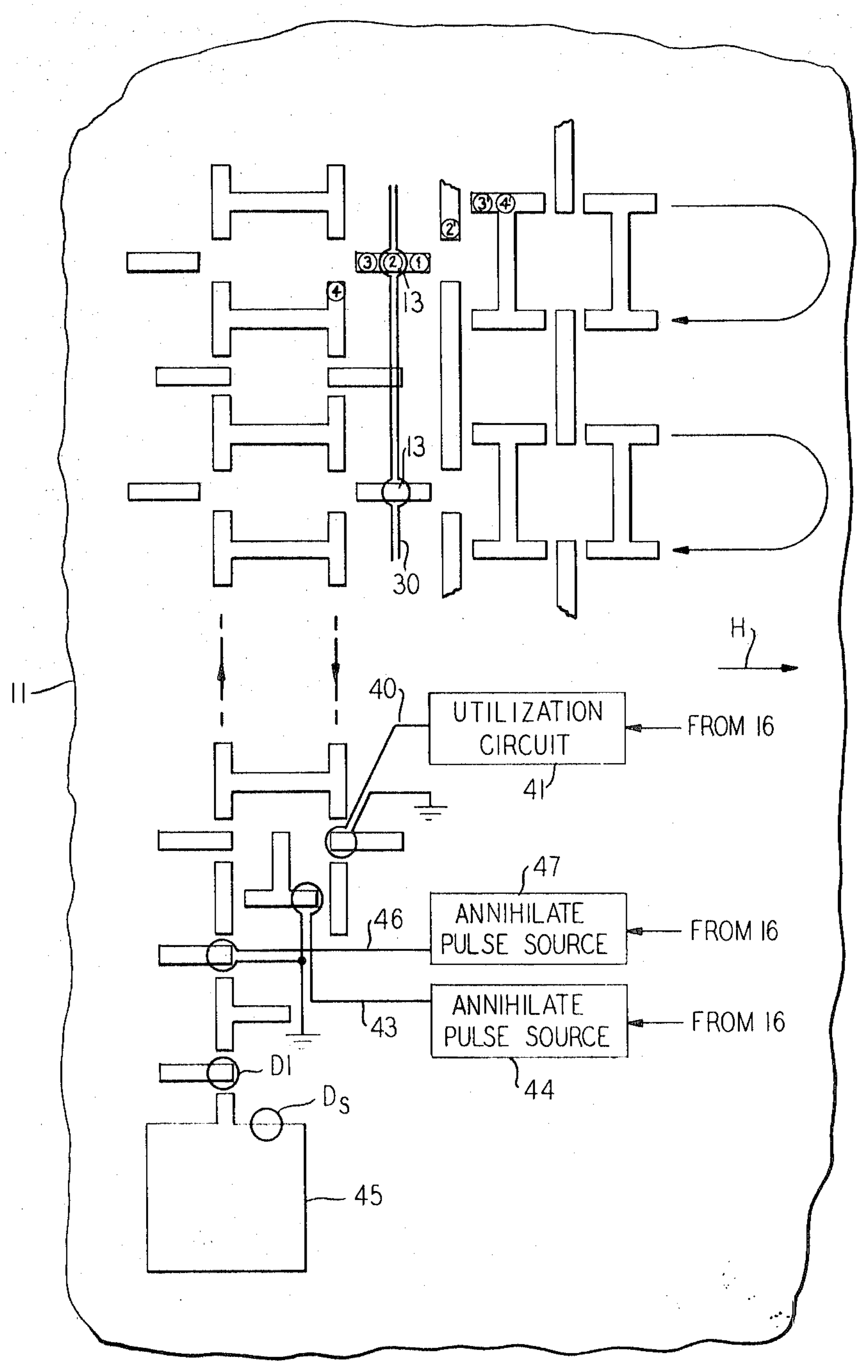

FIG. 3 shows an illustrative conductor 30 coupling transfer positions 13 for the channels of the right (and/or left) bank of FIG. 1. The conductor is connected between transfer circuit 14 of FIG. 1 and ground. As stated above, we have selected for illustrative purposes to move information from right to left to consecutive positions designated 1, 2, 3, and 4 in FIG. 2. Alternative sets of positions 1, 2, 3, and 4 and 1, 2′, 3′, 4′, shown in FIG. 3, are available for the movement of a domain in position 4 of FIG. 2 during the next rotation of the inplane field. The transfer loop can be seen to encompass one of the alternative second positions for a domain. Domain transfer occurs during he inplane field cycle in which the pulsing of conductor 30 determines that a domain moves from position 1 to position 2 of FIG. 3 rather than to position 2′ of FIG. 3.

Figure 4:
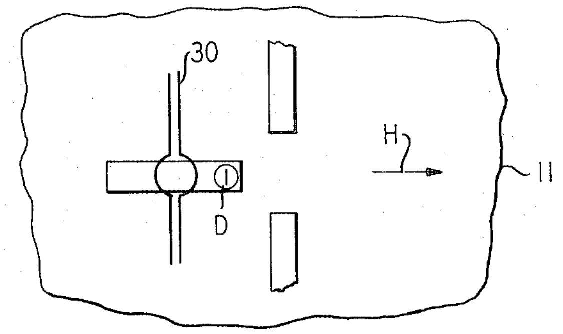
Figure 5:
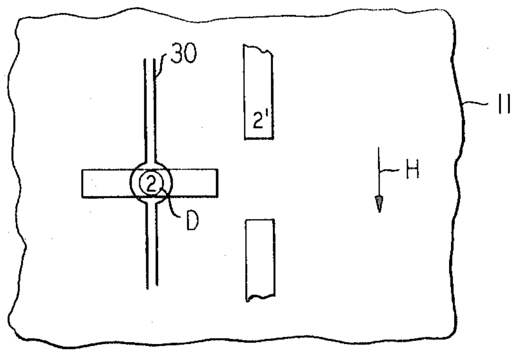
Figure 6:
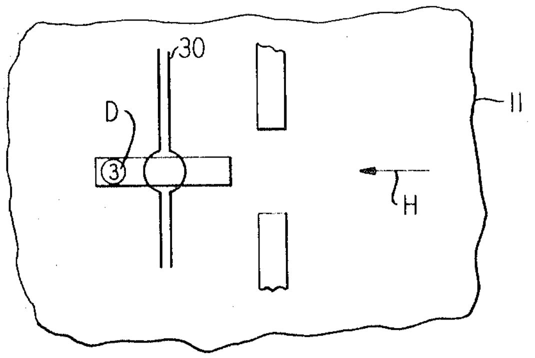
Figure 7:
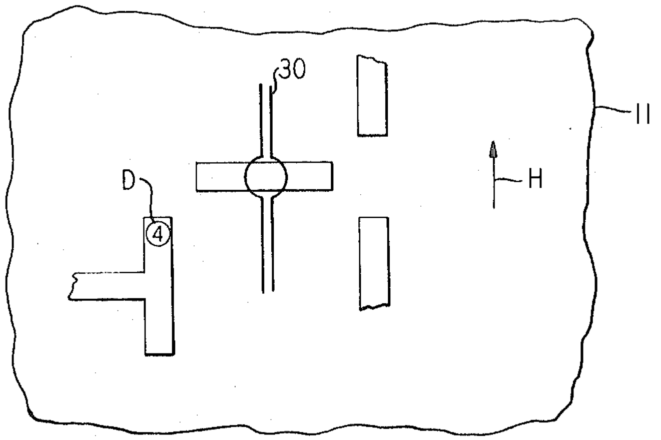

To be specific, after the inplane field moves a domain to position 1 of FIG. 3 (shown enlarged in FIG. 4), circuit 14 of FIG. 1 pulses conductor 30 causing a domain in position 1 to move to the position of the conductor loop. Such a pulse is coincident with (initiated slightly ahead of) the reorientation of the inplane field for moving a domain to a 2′ position as shown in FIG. 5. The pulse generates a field to override the attraction of poles at position 2′ in FIG. 5. The inplane field thereafter reorients to a direction to move a domain to a position 3 as shown in FIG. 6 and the pulse applied to conductor 30 terminates. Transfer is complete When the inplane field next reorients, domain D is in the vertical channel at a position 4 as shown in FIG. 7.

In the absence of the pulse in conductor 30, a domain moves to recirculate in its horizontal channel as indicated by the 2′, 3′ and 4′ at the top of FIG. 3 as viewed.

The transfer operation is shown for a representative domain D in FIGS. 4–7. Propagation of all like-transferred information from parallel horizontal channels continues along the vertical channel. Information transferred by conductor 30 from the right bank of channels moves downward, as viewed in FIG. 3; information transferred from the left bank, of course, moves upward. It should be observed that if information is moved from all channels of both the right- and left-hand banks of FIG. 1, a thousand bit word (500 in each bank) is transferred to the vertical channel, and one thousand vacancies are created in the parallel channels.

The vertical and parallel channels are chosen to include a like number of bits in order to present information to a read-write position in the shortest possible time. It may be appreciated that a bit most remote from a read-write position in this instance need move at most 1,000 bit locations along a horizontal channel and 1,000 bit locations along the vertical channel or 2,000 bit locations in all. For microsecond data rates, access for the illustrative million bit memory is, therefore, 2 milliseconds maximum.

Information transfer can be accomplished also by an altered overlay geometry at the transfer position to change the route of information in response to correctly phased changes in the inplane field. For example, a reversal of the orientation sequence for the inplane field can be made to route information along different channels if an intersection of the channel has a geometry to so respond.

Regardless of the transfer mechanism, information transferred thereby to the vertical channel of FIG. 1 presents itself sequentially at a write and read location as the inplane field continues to reorient.

FIG. 3 shows in detail an illustrative implementation for a write or read operation. Input and output information in a recirculating channel is sequential. The read operation in an arrangement organized in accordance with this invention, accordingly, requires that consecutive bit (domain or no domain) be sensed consecutively.

Representative conductor 40 of FIG. 3, for example, is adapted to this end. The conductor couples a third phase position for detecting the passage of domains there and is connected between a utilization circuit 41 and ground. In practice, a Hall probe may be used alternatively.

Information continues to recirculate clockwise in the vertical channel after detection until the information returns to the corresponding transfer positions (13 of FIG. 1). Since information in the horizontal channels moves synchronously and all channels have a like number of bit locations, the horizontal channels have vacancies at the transfer positions when information in the vertical channel is positioned for transfer. The transfer operation back into the horizontal channels is entirely analogous to that described above and is carried out under the control of control circuit 16. As can be seen from FIG. 3, however, the phase during which the transfer back to horizontal channels occurs is different from that during which transfer to the vertical channel occurs. Control circuit 16 of FIG. 1 determines the direction of transfer by allowing the pulsing of conductor 30 during the proper phase.

The write operation requires the sequential annihilation of the information transferred to the vertical loop and the sequential writing of substitute information. Conductor 43 is shown coupled to a first phase position for annihilating domains there. To be specific, conductor 43 is connected between an annihilate pulse source 44 and ground and is pulsed to collapse domains during each first phase of the inplane field cycle during a write operation. In practice, the annihilating pulse is applied after the domain is moved into a first phase position.

Magnetically soft overlay disc 45 of FIG. 3, including a source domain $D_s$, generates domains selectively during a write operation as disclosed in copending application Ser. No. 756,210 filed Aug. 29, 1968 for A. J. Perneski, now U.S. Pat. No. 3,555,527. Each third phase, the rotating inplane field is augmented to generate a domain D1 as shown in FIG. 3. A conductor 46 couples the next consecutive first phase position for the domain so generated. Conductor 46 is connected between an annihilate pulse source 47 and ground, operating to collapse selectively domains generated at 45. In the illustrative arrangement, disc 45 is operated to generate domains continuously. In this case, source 47 pulses conductor 46 continuously during a read operation to avoid introducing spurious information into the data stream. Alternatively, the inplane field may be augmented selectively to introduce information.

As can be seen from the geometry of the overlay, disc r5 introduces information at a juncture one full cycle behind that of the annihilation operation carried out by pulsing conductor 43. Consequently, substitute information is generated one cycle ahead of annihilation.

The various sources and circuits are connected to control circuit 16 of FIG. 1 for synchronization and may be any such elements capable of operating in accordance with this invention.

To recapitulate, a memory organization in accordance with this invention functions to move information continuously in horizontal recirculating bit channels. The information is organized in binary words with the individual bits of a word located at corresponding address locations in the horizontal channels. The bits of consecutive words are advanced to positions for transfer in parallel on command to a perpendicular read-write recirculating channel. Information so transferred is advanced for sequential read or write operations. The organization of the storage and read-write channels in like number of bit locations permits synchronous operation with a minumum amount of ancillary control and utilization circuitry.

The objective of a high-speed, high packing density memory is achieved. In addition, only a few external connections are utilized; namely, connections for the control circuit 16 in FIG. 1, utilization circuit 41 in FIG. 3, and annihilate pulse sources 44 and 47 in FIG. 3.

What has been described is considered only illustrative of the principles of this invention. Therefore, other and different arrangements according to those principles may be devised by one skilled in the art without departing from the spirit and scope of this invention.

What is claimed is:

1. A domain propagation arrangement comprising a medium in a plane in which single wall domains can be moved, a magnetically soft overlay for defining in said medium $n$ first recirculating channels for said domains in response to a reorienting inplane field, each of said channels including a first position and normally providing a permanent store for domains therein, said magnetically soft overlay also defining a second recirculating channel including at least $n$ bit locations for single wall domains and normally providing a temporary store for domains, means for selectively transferring domain patterns between said first positions and said second channel, means for detecting the presence and absence of domains at an output position in said second channel, means for storing domains selectively at an input position in said second channel, and means for providing said reorienting inplane field.

2. An arrangement in accordance with claim 1 wherein said magnetically soft overlay comprises bar and T-shaped layers juxtaposed with a surface of said medium and said inplane field reorients by continuous rotation.

3. An arrangement in accordance with claim 2 wherein each of said first and said second recirculating channels includes $n$ bit locations for single wall domains.

4. An arrangement in accordance with claim 3 wherein said means for selectively transferring comprises an electrical conductor coupling all of said first positions serially for transferring said domain pattern when pulsed, and means for selectively pulsing said conductor.

5. A domain propagation arrangement comprising a medium in a plane in which single wall domains can be moved, means for defining in said medium a plurality of first recirculating channels for single wall domains, each of said channels including a first position and normally providing a permanent store for domains, means for defining a second recirculating channel in said medium, said second channel normally providing a temporary store for domains, means for moving said domains synchronously in said first and second channels, and means for selectively transferring domain patterns between said first positions and said second channel, wherein said means for defining said first and second channels comprises a pattern of magnetic elements responsive to a reorienting inplane field for moving domains in said medium and wherein said means for moving comprises a magnetic field reorienting in said plane in the presence of said elements, the relationship between the number of bit locations in each of said first channels and in said second channel being such that when transfer occurs the transfer of domains from said first channels to said second leaves a vacancy for a domain pattern in said first positions and the transfer of a domain pattern from said second channel to said first positions results in the occupancy of said vacancy.

6. An arrangement in accordance with claim 5 also including means for detecting domains selectively at an output position in said second channel, and means for storing domains selectively at an input position in said second channel.

7. An arrangement in accordance with claim 6 wherein said means for transferring includes means responsive to a first signal for transferring a domain pattern from said first positions into said second channel and for returning said domain pattern to said first position at a time when said positions are vacant.

8. An arrangement in accordance with claim 7 wherein said means for transferring also includes means responsive to a second signal for transferring a domain pattern from said first positions into said second channel and for annihilating said domain pattern at said output position.